(12) United States Patent
Li et al.

(10) Patent No.: US 12,164,726 B2
(45) Date of Patent: Dec. 10, 2024

(54) TOUCH DISPLAY DRIVING APPARATUS, METHOD AND TOUCH DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Shuwei Li, Beijing (CN); KwangGyun Jang, Beijing (CN); Hongqiang Luo, Beijing (CN); Jungyoup Suk, Beijing (CN); Qiang Wang, Beijing (CN); Jaeseung Kim, Beijing (CN)

(73) Assignees: Beijing BOE Technology Development Co., Ltd., Beijing (CN); Chengdu BOE Optoelectronics Technology Co., Ltd., Sichuan (CN)

( * ) Notice: Subject to any disclaimer, the term of this patent is extended or adjusted under 35 U.S.C. 154(b) by 0 days.

(21) Appl. No.: 17/909,445

(22) PCT Filed: Nov. 12, 2021

(86) PCT No.: PCT/CN2021/130276
§ 371 (c)(1),
(2) Date: Sep. 6, 2022

(87) PCT Pub. No.: WO2022/193694
PCT Pub. Date: Sep. 22, 2022

(65) Prior Publication Data
US 2024/0192805 A1    Jun. 13, 2024

(30) Foreign Application Priority Data
Mar. 19, 2021 (CN) .......... 202110298446.7

(51) Int. Cl.
G06F 3/041 (2006.01)

(52) U.S. Cl.
CPC ........ *G06F 3/04184* (2019.05); *G06F 3/0412* (2013.01)

(58) Field of Classification Search
CPC .......................... G06F 3/04184; G06F 3/0412
See application file for complete search history.

(56) References Cited

U.S. PATENT DOCUMENTS

| | | | |
|---|---|---|---|
| 2010/0177106 A1* | 7/2010 | Kim | G09G 5/39 345/531 |
| 2015/0002462 A1* | 1/2015 | Zhao | G06F 3/0446 345/174 |

(Continued)

FOREIGN PATENT DOCUMENTS

| | | |
|---|---|---|
| CN | 103207720 A | 7/2013 |
| CN | 108089758 A | 5/2018 |

(Continued)

OTHER PUBLICATIONS

International Search Report for PCT/CN2021/130276 Mailed Feb. 17, 2022.

*Primary Examiner* — Temesghen Ghebretinsae
*Assistant Examiner* — Sosina Abebe
(74) *Attorney, Agent, or Firm* — Ling Wu; Stephen Yang; Ling and Yang Intellectual Property (57) ABSTRACT

A touch display driving apparatus, a method, and a touch display apparatus are provided. The touch display driving apparatus is connected with a touch display panel; and the touch display driving apparatus includes a controller and a memory connected with the controller, wherein the memory is configured to store display data and touch data; and the controller is configured to perform a first reading and writing operation for reading and writing display data in the memory, when the touch display panel is in a display working period; or, perform a second reading and writing (Continued)

operation for reading and writing touch data in the memory, when the touch display panel is in a touch working period.

18 Claims, 7 Drawing Sheets

(56) References Cited

U.S. PATENT DOCUMENTS

| | | | |
|---|---|---|---|
| 2015/0301676 A1* | 10/2015 | Xu | G06F 3/04166 345/174 |
| 2020/0089360 A1* | 3/2020 | Sen | G06F 3/04886 |
| 2020/0142524 A1* | 5/2020 | Liu | G06F 3/0412 |
| 2020/0174614 A1 | 6/2020 | Fan | |
| 2022/0187997 A1* | 6/2022 | Chu | G06F 3/0637 |

FOREIGN PATENT DOCUMENTS

| | | |
|---|---|---|
| CN | 108874213 A | 11/2018 |
| CN | 112860125 A | 5/2021 |

* cited by examiner

TOUCH DISPLAY DRIVING APPARATUS, METHOD AND TOUCH DISPLAY APPARATUS

CROSS-REFERENCE TO RELATED APPLICATIONS

The present application is a U.S. National Phase Entry of International Application No. PCT/CN2021/130276 having an international filing date of Nov. 12, 2021, which claims priority to Chinese patent application No. 202110298446.7, filed to CNIPA on Mar. 19, 2021 and entitled "Touch Display Driving Apparatus, Method and Touch Display Apparatus". The above-identified applications are hereby incorporated by reference.

TECHNICAL FIELD

Embodiments of the present disclosure relate to, but are not limited to, the field of display technologies, and particularly to a touch display driving apparatus, a method, and a touch display apparatus.

BACKGROUND

With a continuous development of display technologies, touch display apparatuses have been widely used. Usually, a touch panel and a display panel in a touch display apparatus are independently controlled by two chips, respectively. In order to improve an integration level of the touch display apparatus, a Touch and Display Driver Integration (TDDI) chip emerges as the times required.

TDDI products are widely used because of their relatively high touch sensitivity, lightness and thinness, and other advantages. However, a current TDDI chip only simply integrates a function of a touch driving chip and a function of a display driving chip into a single chip. In a working operation, the function of the touch driving chip and the function of the display driving chip work in two independent memories, such as Random Access Memories (Rams), which will lead to a relatively large device size and a relatively high power consumption.

SUMMARY

The following is a summary of subject matters described herein in detail. The summary is not intended to limit the protection scope of claims.

In a first aspect, an embodiment of the present disclosure provides a touch display driving apparatus, which is connected with a touch display panel; the touch display driving apparatus includes a controller and a memory connected with the controller, wherein, the memory is configured to store display data and touch data; and the controller is configured to perform a first reading and writing operation for reading and writing the display data in the memory, when the touch display panel is in a display working period; or, perform a second reading and writing operation for reading and writing the touch data in the memory, when the touch display panel is in a touch working period.

In a second aspect, an embodiment of the present disclosure provides a touch display apparatus, which includes a touch display panel and a touch display driving apparatus connected with the touch display panel, wherein, the touch display driving apparatus is a touch display driving apparatus in the above embodiment.

In a third aspect, an embodiment of the present disclosure provides a driving method, which is applied to a touch display driving apparatus in the above embodiment. The method includes: performing, by a controller in the touch display driving apparatus, a first reading and writing operation for reading and writing display data in a memory in the touch display driving apparatus, when a touch display panel is in a display working period; or, performing, by the controller, a second reading and writing operation for reading and writing touch data in the memory, when the touch display panel is in a touch working period.

Other characteristics and advantages of the present disclosure will be elaborated in the following specification, and moreover, partially become apparent from the specification or are understood by implementing the present disclosure. Other advantages of the present disclosure may be achieved and obtained through solutions described in the specification and drawings.

Other aspects may be understood upon reading and understanding the drawings and the detailed description.

BRIEF DESCRIPTION OF DRAWINGS

The accompanying drawings are used for providing understanding of technical solutions of the present disclosure, and form a part of the specification. They are used for explaining the technical solutions of the present disclosure together with the embodiments of the present disclosure, but do not form a limitation on the technical solutions of the present disclosure. Shapes and sizes of each component in the drawings do not reflect actual scales, and are only intended to schematically illustrate contents of the present disclosure.

DETAILED DESCRIPTION

However, the description is exemplary and unrestrictive, and more embodiments and implementation solutions are possible within a scope contained in the embodiments described herein. Although many possible combinations of features are shown in the accompanying drawings and discussed in specific implementations, many other combinations of the disclosed features are also possible. Unless expressly limited, any feature or element of any embodiment may be used in combination with, or may replace, any other feature or element in any other embodiment.

When describing representative embodiments, the specification may have presented methods and/or processes as a specific order of acts. However, to an extent that the method or process does not depend on a specific sequence of the acts herein, the method or process should not be limited to the acts in the specific sequence. Those of ordinary skills in the art will understand that other orders of acts may also be possible. Therefore, the specific order of the acts illustrated in the specification should not be interpreted as a limitation on claims. Moreover, the claims directed to the method and/or process should not be limited to performing their acts in the described order, and those skilled in the art will readily understand that these orders may be varied and still remain within the essence and scope of the embodiments of the present disclosure.

In the drawings, a size of each constituent element, a thickness of a layer, or a region is exaggerated sometimes for clarity. Therefore, an implementation of the present disclosure is not necessarily limited to the size shown, and a shape and size of each component in the drawings do not reflect true proportions. In addition, the drawings schematically illustrate ideal examples, and one embodiment of the present disclosure is not limited to the shapes, numerical values, or the like shown in the drawings.

Ordinal numerals such as "first", "second", and "third" in the specification are set to avoid confusion of constituent elements, but not to set a limit in quantity.

In the specification, for convenience, expressions indicating orientation or positional relationships, such as "center", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred apparatus or element has a particular orientation and is structured and operated in the particular orientation. Therefore, they cannot be understood as limitations on the present disclosure. The positional relationships between the constituent elements may be changed as appropriate according to a direction according to which each constituent element is described. Therefore, appropriate replacements can be made according to situations without being limited to the wordings described in the specification.

In the specification, unless otherwise specified and defined explicitly, terms "mount", "mutually connect", and "connect" should be understood in a broad sense. For example, a connection may be a fixed connection, or a detachable connection, or an integrated connection. It may be a mechanical connection or an electrical connection. It may be a direct mutual connection, or an indirect connection through middleware, or internal communication between two components. Those of ordinary skill in the art may understand the specific meanings of the above terms in the present disclosure according to actual situations.

Figure 1A:
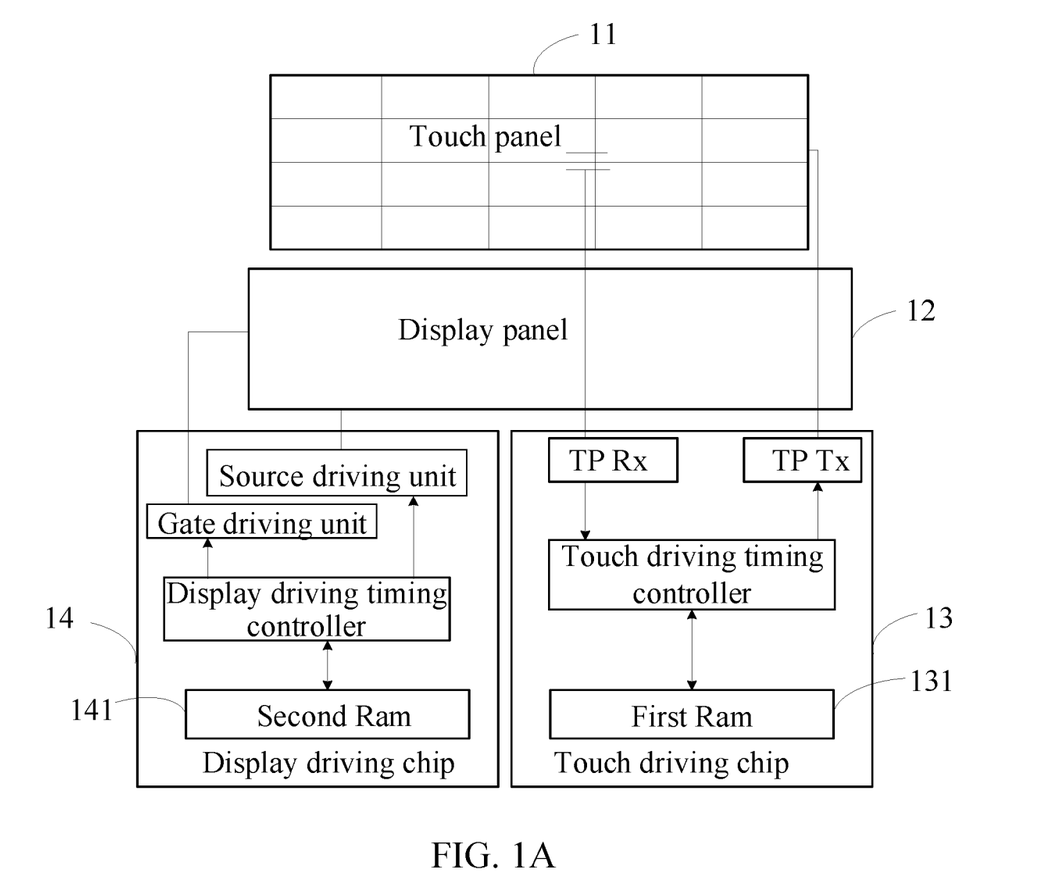
FIG. 1A is a schematic structural diagram of a touch display apparatus.

As shown in FIG. 1A, a touch display panel in a touch display apparatus may be independently controlled by two chips. Here, the touch display panel refers to a display panel with a touch sensing capability. Herein, the touch display panel may include: a Touch Panel (TP) 11 and a display panel 12, wherein the touch panel 11 may be controlled by a touch driving chip (Touch IC, TIC) 13, and the display panel 12 may be controlled by a display driving chip (Display Driver IC, DDI) 14. Here, storage functions are concentrated in the display driving chip 14 and the touch driving chip 13, respectively, For example, a second Ram 141 of the display driving chip 14 is configured to store display data, and a first Ram 131 of the touch driving chip 13 is configured to store touch data (such as to store a touch sensing signal collected by a touch electrode in the touch panel). It can be seen that in the solution shown in FIG. 1A, functions of Rams are respectively located in two ICs.

Figure 1B:
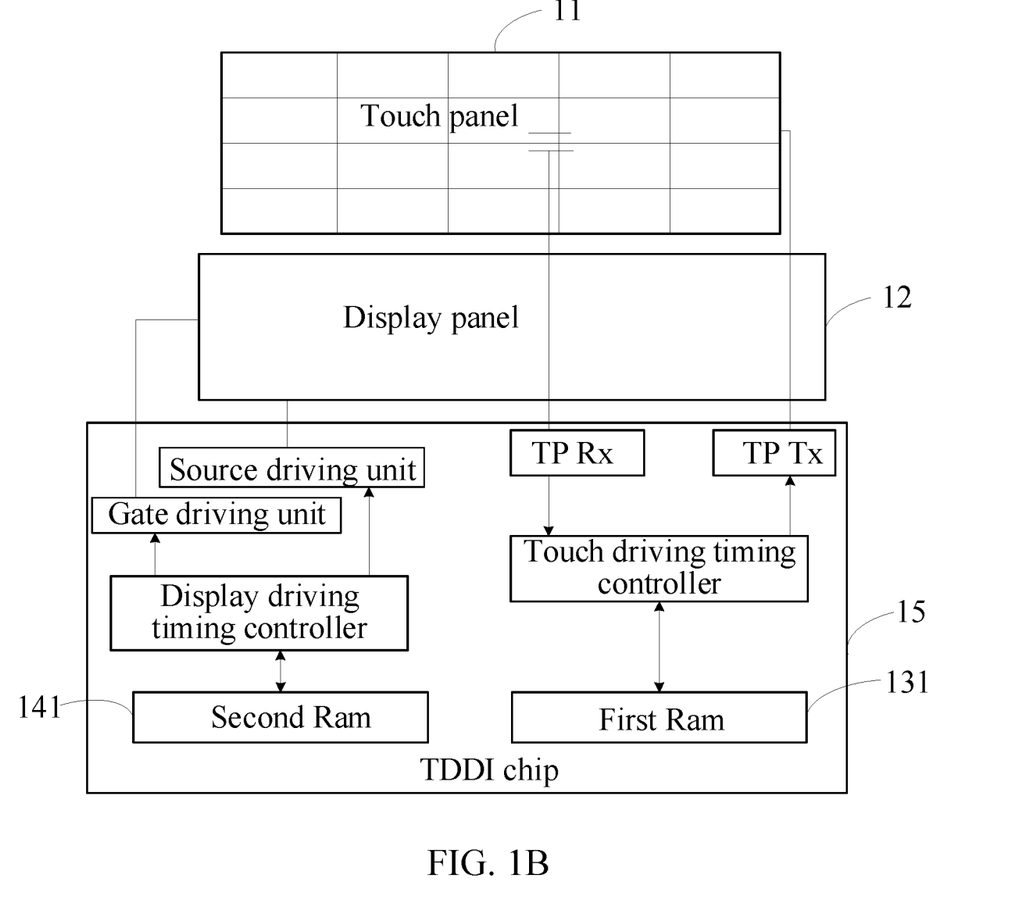
FIG. 1B is a schematic structural diagram of another touch display apparatus.

As shown in FIG. 1B, in order to improve an integration level of the touch display apparatus, functions of the display driving chip and the touch driving chip may be integrated in one TDDI chip 15 to drive the touch display panel, at which time the touch panel 11 and the display panel 12 in the touch display apparatus may be controlled by one TDDI chip 15. However, in the solution shown in FIG. 1B, the second Ram 141 in the display driving chip and the first Ram 131 in the touch driving chip are only simply encapsulated in the TDDI chip 15. In a working operation, the second Ram 141 and the first Ram 131 in the TDDI chip 15 both work independently and do not achieve a common effect, which will lead to a relatively large device size and a certain loss of power consumption, affecting a development and an application of TDDI chips.

An embodiment of the present disclosure provides a touch display driving apparatus, which may be applied to driving a touch display panel. For example, it may be applied to a touch display apparatus, and the touch display driving apparatus may be connected with a touch display panel in the touch display apparatus.

Figure 2:
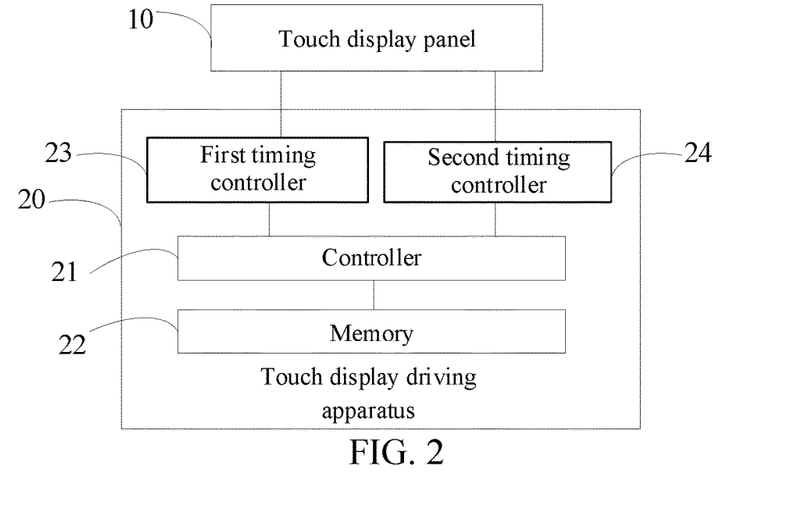
FIG. 2 is a schematic structural diagram of a touch display driving apparatus in an exemplary embodiment of the present disclosure.

As shown in FIG. 2, the touch display driving apparatus 20 may include: a controller 21 and a memory 22 connected with the controller 21, wherein the memory 22 is configured to store display data and touch data; and the controller 21 is configured to perform a first reading and writing operation for reading and writing the display data in the memory 22, when a touch display panel 10 is in a display working period; or perform a second reading and writing operation for reading and writing touch data in the memory 22, when the touch display panel 10 is in a touch working period.

Here, the first reading and writing operation for reading and writing the display data may include: a reading operation for reading the display data from the memory, or a writing operation for writing the display data into the memory. The second reading and writing operation for reading and writing the touch data may include: a reading operation for reading the touch data from the memory, or a writing operation for writing the touch data into the memory.

In this way, in a working operation, the touch display driving apparatus according to the embodiment of the present disclosure uses the controller to adjust reading and writing of the memory, so that the display data and the touch data may share the memory. Thus, by sharing the memory, optimization of a storage space of the memory may be achieved, so that an amount of processed data may be maximized in same processing time. Moreover, by sharing the memory, it may be caused that a size of the touch display driving apparatus will be reduced, which can save a space required by a device, facilitating a development and an application of the device. Moreover, by sharing the memory, a part of power consumption may be effectively reduced, and an utilization rate of a storage space may be improved, so that a power consumption of the device will also be reduced.

In an exemplary embodiment, as shown in FIG. 2, the touch display driving apparatus 20 may further include a first timing controller 23 and a second timing controller 24 respectively connected with the controller 21, the first timing controller 23 and the second timing controller 24 respectively connected with the touch display panel 10; herein, the first timing controller 23 is configured to output a first signal to the controller 21, when the touch display panel 10 is in the display working period; the second timing controller 24 is configured to output a second signal to the controller 21, when the touch display panel 10 is in the touch working period; and the controller 21 is configured to perform a first reading and writing operation for reading and writing display data in the memory 22 in response to the first signal outputted by the first timing controller 23; or, the controller 21 is configured to perform a second reading and writing operation for reading and writing touch data in the memory 22 in response to the second signal outputted by the second timing controller 24, wherein a frequency of the second signal is the same as a frequency of the first signal. In this way, the frequency of the second signal and the frequency of the first signal are the same in the touch display driving apparatus according to the embodiment of the present disclosure, so that the memory may be shared and used in the same frequency, and the same frequency may achieve optimization of memory sharing in the touch display driving apparatus.

For example, when the touch display panel is in the display working period, the first timing controller may output a first signal to the controller to initiate a first reading and writing operation for reading and writing display data; the controller reads one frame of display data from the memory in response to the first signal and sends the frame of display data to the first timing controller; and after receiving the frame of display data sent by the controller, the first timing controller may generate a signal corresponding to the frame of display data to drive the display panel to display.

Figure 3:
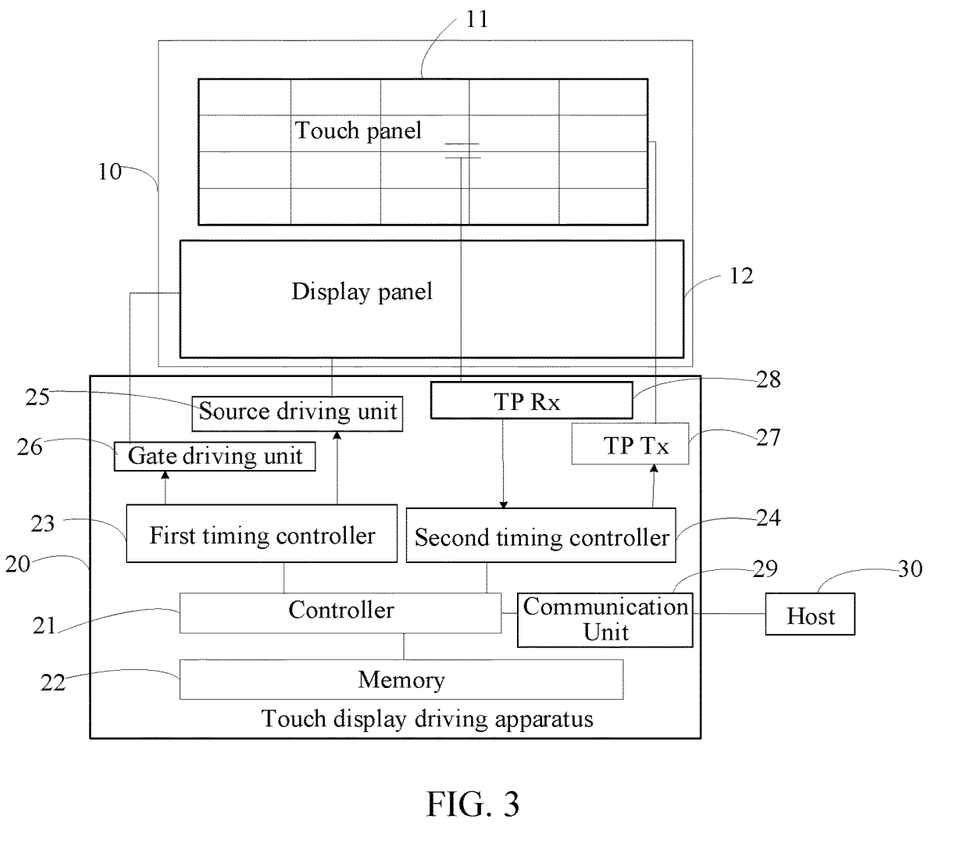
FIG. 3 is another schematic structural diagram of a touch display driving apparatus in an exemplary embodiment of the present disclosure.

In an exemplary embodiment, taking the touch display panel being an Organic Light-Emitting Diode (OLED) display panel as an example, as shown in FIG. 3, the touch display driving apparatus 20 may further include a source driving unit (i.e., a data driver) 25, a gate driving unit (i.e., a scanning driver) 26, and a light-emitting driver (not shown in the figure), and the display panel 12 may include a pixel array (not shown in the figure), wherein the pixel array may include a plurality of scanning signal lines (S1 to Sm), a plurality of data signal lines (D1 to Dn), a plurality of light-emitting signal lines (E1 to Eo), and a plurality of pixels Pxij. For example, the first timing controller 23 may provide a gray-scale value and a control signal, which are suitable for a specification of the source driving unit (i.e., the data driver) 25, to the source driving unit (i.e., the data driver) 25, provide a clock signal, a scanning start signal, or the like, which are suitable for a specification of the gate driving unit (i.e., the scanning driver) 26, to the gate driving unit (i.e., the scanning driver) 26, and provide a clock signal, a light-emitting stop signal, or the like, which are suitable for a specification of the light-emitting driver, to the light-emitting driver. The source driving unit (i.e., the data driver) 25 may generate a data voltage to be provided to the data signal lines D1, D2, D3, . . . , and Dn by utilizing the gray-scale value and the control signal that are received from the first timing controller 23. For example, the source driving unit (i.e., the data driver) 25 may sample the gray-scale value by utilizing the clock signal, and apply a data voltage corresponding to the gray-scale value to the data signal lines D1 to Dn by taking a pixel row as a unit, wherein n may be a natural number. The gate driving unit (i.e., the scanning driver) 26 may generate scanning signals to be provided to the scanning signal lines S1, S2, S3, . . . , and Sm by receiving the clock signal, the scanning start signal, or the like, from the first timing controller 23. For example, the gate driving unit (i.e., the scanning driver) 26 may provide sequentially scanning signals with conducted level pulses to the scanning signal lines S1 to Sm. For example, the gate driving unit (i.e., the scanning driver) 26 may be constructed in a form of a shift register, and may generate scanning signals by transmitting sequentially scanning start signals provided in a form of conducted level pulses to a next-stage circuit under controlling of the clock signal, wherein m may be a natural number. The light-emitting driver may generate light-emitting signals to be provided to the light-emitting signal lines E1, E2, E3, . . . , and Eo, by receiving the clock signal, the light-emitting stop signal, or the like, from the first timing controller 23. For example, the light-emitting driver may provide sequentially light-emitting signals with turn-off level pulses to the light-emitting signal lines E1 to Eo. For example, the light-emitting driver may be constructed in a form of a shift register, and may generate light-emitting signals by transmitting sequentially light-emitting stop signals provided in a form of turn-off level pulses to a next-stage circuit under controlling of the clock signal, wherein o may be a natural number. The pixel array may include a plurality of pixels PXij. Each pixel PXij may be connected to the corresponding data signal line, the corresponding scanning signal line, and the corresponding light-emitting signal line, wherein, i and j may be natural numbers. The pixel PXij may refer to a pixel in which a transistor is connected to an i-th scanning signal line and is connected to a j-th data signal line. In this way, it is achieved that the display panel 12 is driven to display.

For example, when the touch display panel is in the touch working period, the second timing controller may provide a touch driving signal to the touch panel and receive a touch sensing signal returned by the touch panel; after receiving the touch sensing signal, the second timing controller may process the touch sensing signal, output a second signal to the controller, and output touch data corresponding to the touch sensing signal to the controller to initiate a second reading and writing operation for reading and writing the touch data; and the controller stores the touch data corresponding to the touch sensing signal in the memory in response to the second signal.

In an exemplary embodiment, taking the touch display panel as an OLED display panel as an example, as shown in FIG. 3, the touch display driving apparatus 20 may further include a touch driver (TP Tx) 27 and a data reader (TP Rx) 28, and the touch panel 11 may include a plurality of touch electrodes (sensor pads) arranged in an array. For example, a touch electrode may be a sensing electrode for self-capacitive touch sensing, or a driving electrode for mutual capacitive touch sensing. For example, the second timing controller 24 may provide a clock signal adapted to the touch driver (TP Tx) 27 to the touch driver (TP Tx) 27 to read a touch sensing signal generated by the touch electrodes on the touch panel 11, and may provide touch data corresponding to the received touch sensing signal generated by touch electrodes to the controller 21. The touch driver (TP Tx) 27 may utilize the clock signal received from the second timing controller 24 to generate touch driving signals to be provided to the touch electrodes on the touch panel 11. The data reader (TP Rx) 28 may read the touch sensing signal generated by the touch electrodes on the touch panel 11, and provide the touch sensing signal the second timing controller 24, so that the second timing controller 24 generates touch data to be stored to the memory 22 according to the received touch sensing signal, so that the controller 21 stores the touch data received from the second timing controller 24 to the memory 22 to identify whether a user touches the touch display panel 10 and a touch position of the user.

In an exemplary embodiment, clock cycles of the first signal and the second signal may each include a first time segment and a second time segment, wherein the second time segment follows the first time segment; the controller is configured to perform, based on a signal corresponding to the first time segment in the first signal, a first reading and writing operation for reading and writing display data in the memory; or, perform, based on the signal corresponding to the second time segment in the second signal, a second reading and writing operation for reading and writing touch data in the memory. In this way, when the touch display apparatus is driven by the touch display driving apparatus, for each frame of image, in a same frequency, the first reading and writing operation for reading and writing the display data is firstly performed, and then the second reading and writing operation for reading and writing the touch data is performed, which may achieve a relatively good user experience.

For example, taking that a clock cycle T of the first signal and the second signal may be divided into M sub-time segments as an example, the first time segment may be the first X sub-time segments of M sub-time segments, and the second time segment may be the last Y sub-time segments of M sub-time segments, wherein both X and Y are positive integers greater than or equal to 1.

In an exemplary embodiment, a duration of the second time segment and a duration of the first time segment may be the same. In this way, the touch display driving apparatus may allocate same display duration and touch duration to each frame of image. So, balanced display effect and touch effect may be achieved.

In an exemplary embodiment, a duration of the second time segment and a duration of the first time segment may be different. For example, the duration of the first time segment may be greater than the duration of the second time segment.

Figure 4:
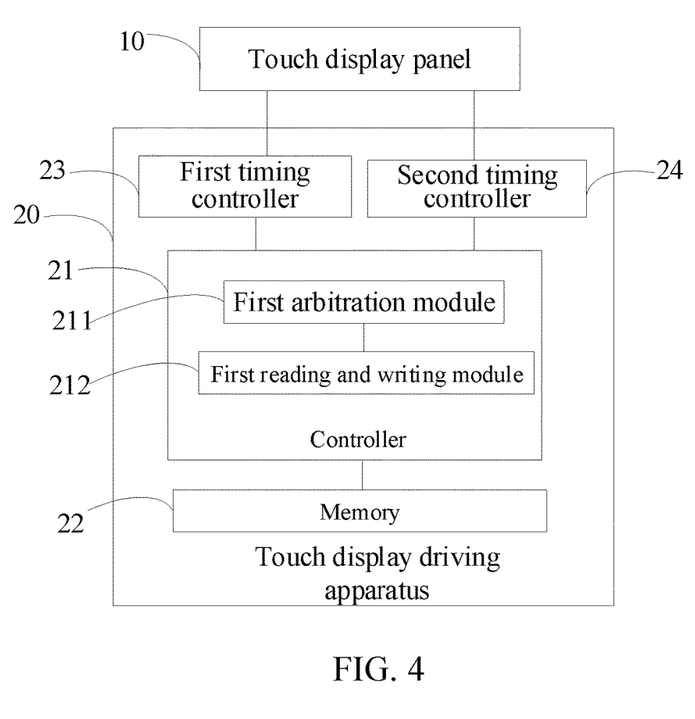
FIG. 4 is yet another schematic structural diagram of a touch display driving apparatus in an exemplary embodiment of the present disclosure.

In an exemplary embodiment, the duration of the first time segment and the duration of the second time segment may be set according to a data amount of data to be read or written by the touch display driving apparatus. For example, when a data amount of touch data to be read or written by the touch display driving apparatus is relatively large (that is, a data amount of data to be read or written corresponding to the first reading and writing operation for reading and writing the display data is smaller than a data amount of data to be read or written corresponding to the second reading and writing operation for reading and writing the touch data), the duration of the second time segment may be set to be greater than the duration of the first time segment. In this way, the touch display driving apparatus may allocate a longer touch duration to each frame of image, so that a relatively good touch effect may be achieved, when the touch display apparatus is driven by the touch display driving apparatus. For another example, as shown in FIG. 4, when a data amount of touch data to be read or written by the touch display driving apparatus is relatively small (that is, a data amount of data to be read or written corresponding to the first reading and writing operation for reading and writing the display data is larger than a data amount of data to be read and written corresponding to the second reading and writing operation for reading and writing the touch data), the duration of the first time segment may be set to be greater than the duration of the second time segment. In this way, the touch display driving apparatus may allocate a longer display duration to each frame of image, so that a relatively good display effect may be achieved, when the touch display apparatus is driven by the touch display driving apparatus.

For example, taking a clock cycle of the first signal and the second signal being T as an example, as shown in FIG. 4, when a data amount of touch data to be read or written by the touch display driving apparatus is relatively small and a data amount of display data to be read or written by the touch display driving apparatus is relatively large, it may be set that the duration of the first time segment is 0.5 T and the duration of the second time segment is 0.3 T.

Figure 5:
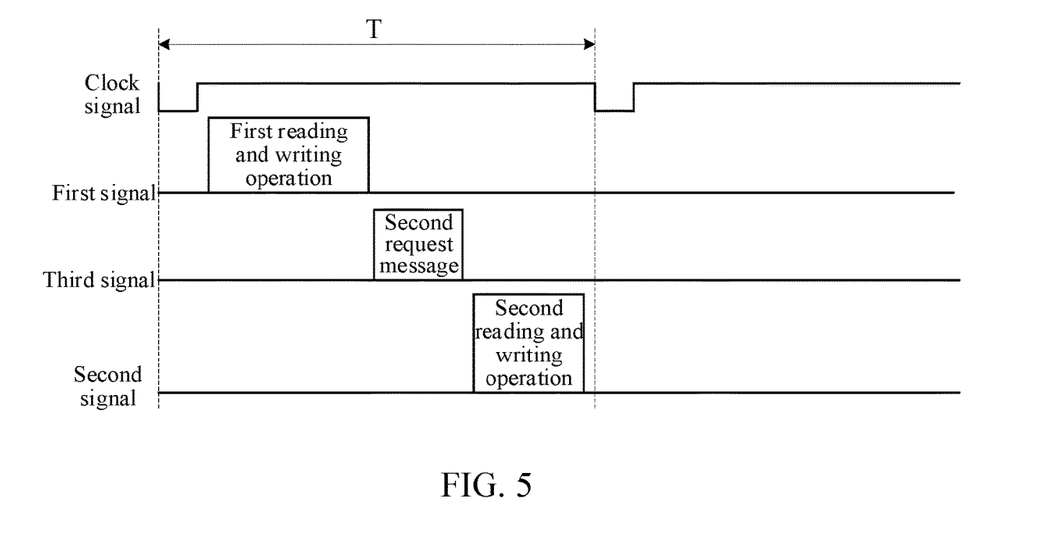
FIG. 5 is a schematic timing diagram of a touch display driving apparatus in an exemplary embodiment of the present disclosure.

In an exemplary embodiment, as shown in FIG. 4, the controller 21 may include: a first reading and writing module 212 and a first arbitration module 211, wherein, the first arbitration module 211 is configured to determine different priorities for the first reading and writing operation for reading and writing the display data and the second reading and writing operation for reading and writing the touch data, when a conflict between the first reading and writing operation for reading and writing the display data and the second reading and writing operation for reading and writing the touch data occurs; and the first reading and writing module 212 is configured to perform the first reading and writing operation for reading and writing the display data and the second reading and writing operation for reading and writing the touch data in the memory 22, in order of priority from high to low. In this way, in a working operation of the touch display driving apparatus according to the embodiment of the present disclosure, because the memory may be shared and used in the same frequency, a case of producing a conflict due to reading and writing the display data and the touch data at the same time may occur (for example, as shown in FIGS. 4 and 5, when the first signal outputted by the first timing controller 23 to the controller 21 for initiating the first reading and writing operation and the second signal outputted by the second timing controller 24 to the controller 21 for initiating the second reading and writing operation arrive at the same time, a case in which a conflict between the first reading and writing operation for reading and writing the display data and the second reading and writing operation for reading and writing the touch data will occur). In this way, through the first arbitration module added within the controller, different priorities may be determined for the first reading and writing operation for reading and writing the display data and the second reading and writing operation for reading and writing the touch data, so that a conflict of performing reading and writing operations on the memory at the same time may be avoided. Furthermore, a sharing effect of the memory is made to be relatively good.

In an exemplary embodiment, a priority of the first reading and writing operation for reading and writing the display data is higher than a priority of the second reading and writing operation for reading and writing the touch data.

In an exemplary embodiment, the first arbitration module may set priorities of the first reading and writing operation for reading and writing the display data and the second reading and writing operation for reading and writing the touch data according to a data amount of data to be read or written by the touch display driving apparatus. For example, when a data amount of touch data to be read or written by the touch display driving apparatus is relatively large (that is, a data amount of data to be read or written corresponding to the first reading and writing operation for reading and writing the display data is smaller than a data amount of data to be read or written corresponding to the second reading and writing operation for reading and writing the touch data), as shown in FIG. 5, the first arbitration module may set the priority of the first reading and writing operation for reading and writing the display data to be relatively high (i.e., the priority of the first reading and writing operation for reading and writing the display data is higher than the priority of the second reading and writing operation for reading and writing the touch data), so that a relatively good display effect may be achieved. For another example, when a data amount of touch data to be read and written by the touch display driving apparatus is relatively small (that is, a data amount of data to be read or written corresponding to the first reading and writing operation for reading and writing the display data is larger than a data amount of data to be read or written corresponding to the second reading and writing operation for reading and writing the touch data), the first arbitration module may set the priority of the second reading and writing operation for reading and writing the touch data to be relatively high (i.e., the priority of the first reading and writing operation for reading and writing the display data is lower than the priority of the second reading and writing operation for reading and writing the touch data), so that a relatively good touch effect may be achieved.

Figure 6:
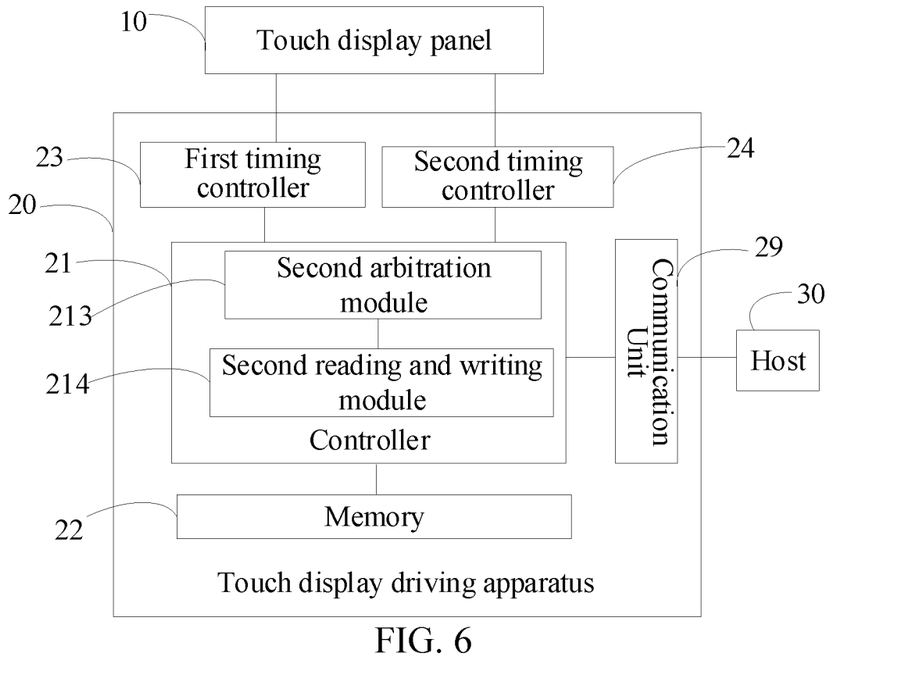
FIG. 6 is further another schematic structural diagram of a touch display driving apparatus in an exemplary embodiment of the present disclosure.

In an exemplary embodiment, as shown in FIGS. 3 and 6, the touch display driving apparatus 20 may further include a communication module 29, wherein the communication module 29 is configured to perform data communication with a host 30; the controller 21 may be configured to read first data from data stored in the memory 22, in response to a first request message for reading the first data from the host 30 received through the communication module 29; and send the first data to the host 30 through the communication module 29; or, store second data from the host 30 received through the communication module 29 in the memory 22, in response to a second request message for writing the second data from the host 30 received through the communication module 29.

In an exemplary embodiment, the first data may include the touch data.

In an exemplary embodiment, the second data may include the display data.

In an exemplary embodiment, taking the touch display panel being a display panel in a wearable device as an example, the host may be integrated in the wearable device, or may be an external computer device that can be connected in a wired or wireless manner with the touch display panel. For example, the host may be configured to render an image and send the rendered image to the touch display driving apparatus, so that the touch display driving apparatus may drive, based on the rendered image, the touch display panel to display.

In an exemplary embodiment, as shown in FIG. 6, the controller 21 may include: a second reading and writing module 214 and a second arbitration module 213, wherein the second arbitration module 213 is configured to, when a conflict between at least one reading and writing operation of the first reading and writing operation for reading and writing the display data and the second reading and writing operation for reading and writing the touch data and any one request message of the first request message for reading the first data and the second request message for writing the second data occurs, determine different priorities for the at least one reading and writing operation and the any one request message; and the second reading and writing module is configured to perform at least one reading and writing operation on the memory and respond to any one request message, in order of priority from high to low.

Figure 7:
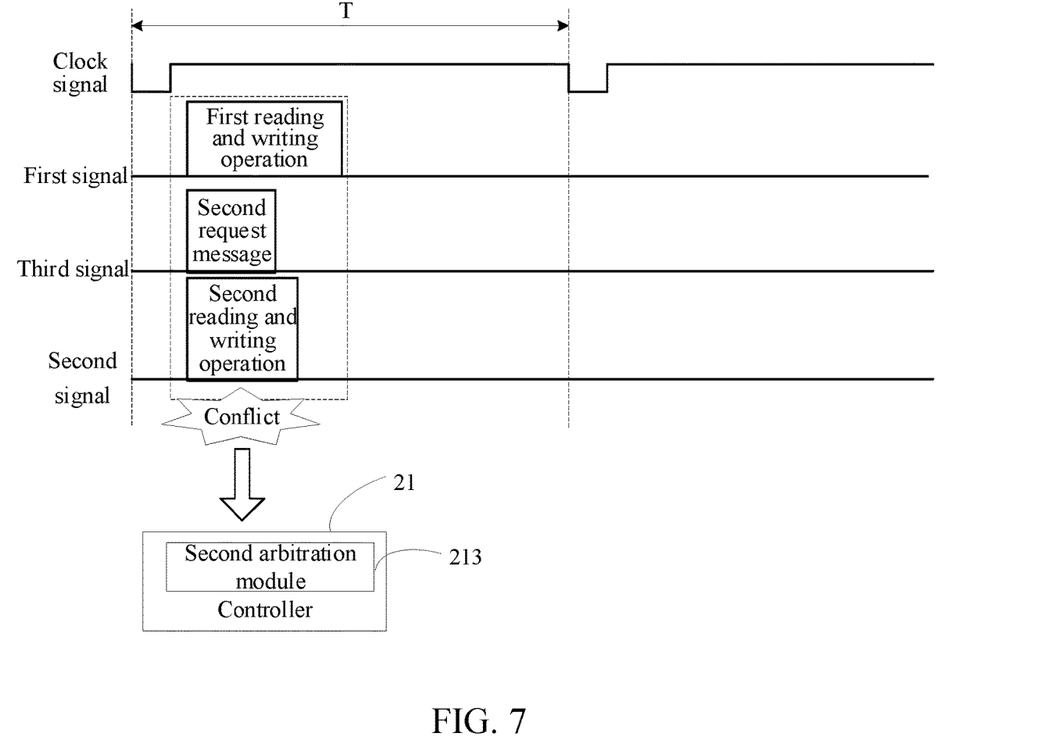
FIG. 7 is another schematic timing diagram of a touch display driving apparatus in an exemplary embodiment of the present disclosure.

For example, as shown in FIG. 7, when the three of the first signal (initiating the first reading and writing operation for reading and writing the display data, for example, for requesting reading one frame of display data) outputted by the first timing controller to the controller, the second signal (initiating the second reading and writing operation for reading and writing the touch data, for example, for requesting writing touch data corresponding to one frame of display data) outputted by the second timing controller to the controller, and a third signal (initiating the second request message for writing the second data, for example, for requesting writing a next frame of display data) outputted by the host to the controller through the communication module arrive at the same time, a conflict among the three of the first reading and writing operation for reading and writing the display data, the second reading and writing operation for reading and writing the touch data, and the second request message for writing the second data will occur, at which time, the second arbitration module 213 in the controller 21 may allocate different priorities to the three of the first reading and writing operation for reading and writing the display data, the second reading and writing operation for reading and writing the touch data, and the second request message for writing the second data. For example, as shown in FIG. 5, the second arbitration module may set that the priority of the first reading and writing operation for reading and writing the display data may be higher than a priority of the second request message for writing the second data, and that the priority of the second request message for writing the second data may be higher than the priority of the second reading and writing operation for reading and writing the touch data. In this way, a relatively good display effect may be achieved.

In an exemplary embodiment, the memory may include: a random access memory.

In an exemplary embodiment, the touch display driving apparatus may be implemented as one TDDI chip.

Figure 8:
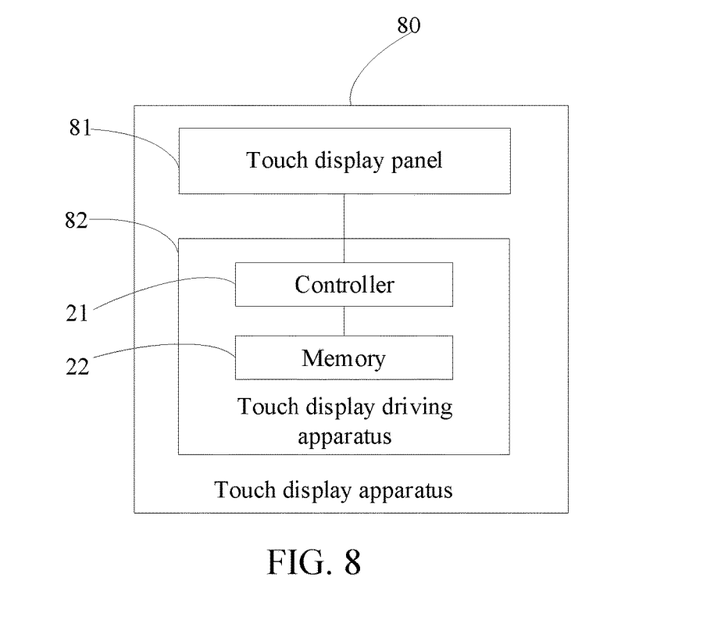
FIG. 8 is a schematic structural diagram of a touch display apparatus in an exemplary embodiment of the present disclosure.

An embodiment of the present disclosure also provides a touch display apparatus. FIG. 8 is a schematic structural diagram of a touch display apparatus in an exemplary embodiment of the present disclosure. As shown in FIG. 8, the touch display apparatus 80 may include: a touch display panel 81 and a touch display driving apparatus 82 in one or more of the above exemplary embodiments, wherein the touch display driving apparatus 82 is connected with the touch display panel 81.

In an exemplary embodiment, the touch display panel has a display region A and a non-display region C located beside the display region A (e.g. one side, both sides or a peripheral side of the display region A), wherein the non-display region C includes a binding region B. Herein, there may be a gap between the display region A and the binding region B. For example, the touch display panel may include a plurality of touch electrodes arranged in an array. For example, the touch display driving apparatus is disposed within the binding region B of the touch display panel. For example, the touch display driving apparatus is electrically connected with a plurality of touch electrodes through a plurality of touch signal lines, and a touch driving signal may be transmitted to the plurality of touch electrodes included in the touch display panel through the plurality of touch signal lines.

In an exemplary embodiment, the touch display apparatus may be a wearable device. In this way, optimization of a space may be achieved by sharing a memory in a touch display driving device, and in same time, maximization of processed data is achieved, so that a size of the touch display driving device is reduced, saving a space. Especially, an available space of the wearable device is relatively small, which still further highlights advantages of the touch display driving device in the embodiment of the present disclosure. Moreover, sharing the memory is achieved in the touch display driving device, which may effectively reduce a part of a power consumption, reducing a power consumption of a product.

For example, the wearable device may include, but is not limited to, a smart helmet or smart glasses, etc. For example, the wearable device may be a Virtual Reality (VR) display device.

In an exemplary embodiment, the wearable device may include: a host. For example, taking the touch display panel being located in the wearable device, the host may be integrated in the wearable device, or may be an external computer device that can be connected in a wired or wireless manner with the touch display panel. For example, the host may be configured to render an image and send the rendered image to the touch display driving apparatus, so that the touch display driving apparatus may drive the touch display panel to display. For example, when the host and the touch display apparatus are physically separated, the host may be a Personal Computer (PC), or when the host and the touch display apparatus are physically integrated, the host may be an Application Processor (AP) in the touch display apparatus.

In an exemplary embodiment, the touch display apparatus may include, but is not limited to, an OLED touch display apparatus or a Liquid Crystal Display (LCD) apparatus, etc.

In addition, the touch display apparatus in the embodiment of the present disclosure may include other needed compositions and structures, such as a gate driving circuit (GOA), a source driver circuit, or the like, in addition to structures such as the above touch display panel, the touch display driving apparatus, or the like, which may be correspondingly designed and supplemented by technicians in the art according to a type of the touch display apparatus, which will not be repeated here.

In an exemplary embodiment, the touch display apparatus may be: any product or component having a display function such as a mobile phone, a tablet computer, a television, a display, a notebook computer, a digital photo frame, or a navigator, etc. Here, no limitation is made to a type of the display apparatus in the embodiment of the present disclosure. Other essential components of the touch display apparatus are all those that those of ordinary skill in the art would understand that the touch display apparatus should have, which will not be repeated here, and should not be taken as a limitation to the present disclosure.

Technical details undisclosed in the embodiments of the touch display apparatus of the present disclosure may be understood by those skilled in the art with reference to the descriptions in the embodiments of the touch display driving apparatus of the present disclosure, which will not be repeated here.

An embodiment of the present disclosure further provides a driving method, which may be applied to a touch display driving apparatus in one or more of the above exemplary embodiments.

Figure 9:
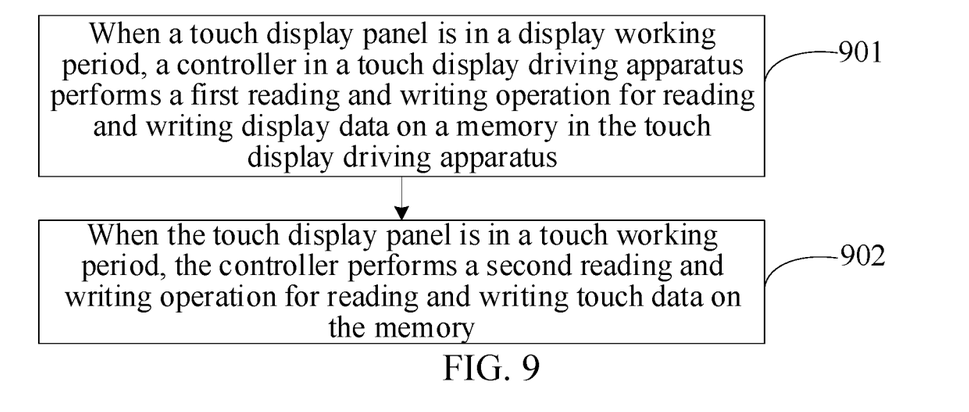
FIG. 9 is a schematic flowchart of a driving method in an exemplary embodiment of the present disclosure.

In an exemplary embodiment, the touch display driving apparatus may include a controller and a memory connected with the controller, wherein the memory is configured to store display data and touch data. FIG. 9 is a schematic flowchart of a driving method in an exemplary embodiment of the present disclosure. As shown in FIG. 9, the driving method may include the following acts 901 to 902.

In the act 901, when a touch display panel is in a display working period, the controller in the touch display driving apparatus performs a first reading and writing operation for reading and writing the display data in the memory in the touch display driving apparatus.

In the act 902, when the touch display panel is in a touch working period, the controller performs a second reading and writing operation for reading and writing the touch data in the memory.

In this way, in a working operation, the touch display driving apparatus according to the embodiment of the present disclosure uses the controller to control reading and writing the memory, so that the display data and the touch data may share the memory. Thus, by sharing the memory, optimization of a storage space of the memory may be achieved, so that an amount of processed data may be maximized in same processing time. Moreover, by sharing the memory, it is caused that a size of the touch display driving apparatus will be reduced, which can save a space required by a device, facilitating a development and an application of the device. Moreover, by sharing the memory, a part of power consumption may be effectively reduced, and an utilization rate of a storage space may be improved, so that a power consumption of the device will also be reduced.

In an exemplary embodiment, the touch display driving apparatus may further include: a first timing controller and a second timing controller respectively connected with the controller. Then the above act 901 may include: the controller performing the first reading and writing operation for reading and writing the display data in the memory, in response to a first signal outputted by the first timing controller. The above act 902 may include the controller performs the second reading and writing operation for reading and writing the touch data in the memory, in response to a second signal outputted by the second timing controller, wherein a frequency of the second signal is the same as a frequency of the first signal.

For example, when the touch display panel is in the display working period, the first timing controller may output the first signal to the controller to initiate the first reading and writing operation for reading and writing the display data; the controller reads one frame of display data from the memory in response to the first signal and sends the frame of display data to the first timing controller; and after receiving the frame of display data sent by the controller, the first timing controller may generate a timing signal corresponding to the frame of display data to drive a display panel to display.

For example, when the touch display panel is in the touch working period, the second timing controller may provide a touch driving signal to a touch panel and receive a touch sensing signal returned by the touch panel; after receiving the touch sensing signal, the second timing controller may process the touch sensing signal, output the second signal to the controller, and output touch data corresponding to the touch sensing signal to the controller to initiate the second reading and writing operation for reading and writing the touch data; and the controller processes the touch sensing signal in response to the second signal and stores the touch data corresponding to the touch sensing signal in the memory.

In some exemplary embodiments, prior to the act 901, the driving method may include the following acts 903 to 904.

In the act 903, when the first signal outputted by the first timing controller to the controller and the second signal outputted by the second timing controller to the controller arrive at the same time, the controller determines different priorities for the first reading and writing operation for reading and writing the display data and the second reading and writing operation for reading and writing the touch data.

In the act 904, the controller executes acts 901 and 902 in order of priority from high to low.

For example, as shown in FIG. 5, when a priority of the first reading and writing operation for reading and writing the display data is higher than a priority of the second reading and writing operation for reading and writing the touch data, the controller first executes 901, and then executes 902. For another example, when a priority of the first reading and writing operation for reading and writing the display data is lower than a priority of the second reading and writing operation for reading and writing the touch data, the controller first executes 902, and then executes 901. In this way, when the memory is shared and used in the same frequency, the priorities of the first reading and writing operation and the second reading and writing operation are determined by the controller, and then executed in order of priority from high to low, which may avoid a conflict that the first timing controller and the second timing controller initiate reading and writing operations in the memory at the same time. Furthermore, a sharing effect of the memory is better.

In an exemplary embodiment, the touch display driving apparatus may further include a communication module, wherein the communication module is configured to perform data communication with a host. Then, the driving method may include the following acts 905 to 906.

In the act 905, the controller reads first data from data stored in the memory, in response to a first request message for reading the first data from the host received through the communication module.

In the act 906, the controller sends the first data to the host through the communication module.

In an exemplary embodiment, the first data may include the touch data.

In an exemplary embodiment, the touch display driving apparatus may further include a communication module, wherein the communication module is configured to perform data communication with the host. Then, the driving method may include the following act 907.

In the act 907, the controller stores second data from the host received through the communication module into the memory, in response to a second request message for writing the second data from the host received through the communication module.

In an exemplary embodiment, the second data may include the display data.

For example, the host may render an image to be displayed and send the rendered image (i.e. the second data) to the communication module through the second request message for writing the second data; the communication module sends a third signal (i.e., a signal corresponding to the second request message for writing the second data) to the controller and sends the rendered image (i.e., the second data) from the host to the controller; and the controller stores the second data into the memory, so that the touch display driving apparatus may drive, based on the rendered image (i.e., the second data), the touch display panel to display.

In an exemplary embodiment, the touch display driving apparatus may further include a communication module, wherein the communication module is configured to perform data communication with a host. Then, prior to the act 901, the act 902, or the act 907, the driving method may include the following acts 903 to 904.

In the act 903, when the three of the first signal (initiating the first reading and writing operation for reading and writing the display data) outputted by the first timing controller to the controller, the second signal (initiating the second reading and writing operation for reading and writing the touch data) outputted by the second timing controller to the controller, and a third signal (a signal corresponding to the second request message for writing the second data, to initiate an operation for writing the second data) outputted by the host to the controller through the communication module arrive at the same time, the controller allocates different priorities to the three of the first reading and writing operation for reading and writing the display data, the second reading and writing operation for reading and writing the touch data, and the second request message for writing the second data.

In the act 904, the controller executes acts 901, 902, and 907 in order of priority from high to low.

For example, as shown in FIG. 5, when a priority of the first reading and writing operation for reading and writing the display data is higher than a priority of the second request message for writing the second data, and the priority of the second request message for writing the second data is higher than the priority of the second reading and writing operation for reading and writing the touch data, the act 901 may be first performed, then the act 907 may be performed, and then the act 902 may be performed. In this way, when the memory is shared and used in the same frequency, the priorities are determined by the controller, and then performing is made in order of priority from high to low, which may avoid a conflict of performing reading and writing operations in the memory at the same time. Furthermore, a sharing effect of the memory is better.

Of course, in addition to the priority setting mode illustrated in one or more of the above exemplary embodiments, other modes may be set according to actual cases by those skilled in the art, and herein, the embodiments of the present disclosure are not limited thereto.

Technical details undisclosed in the embodiment of the driving method of the present embodiment are understood by those skilled in the art with reference to the descriptions in the embodiment of the touch display driving apparatus of the present disclosure, which will not be repeated here.

Although the implementation modes of the present disclosure are disclosed above, the contents are only implementation modes for easily understanding the present disclosure and not intended to limit the present disclosure. Any person skilled in the art to which the present disclosure pertains may make any modification and variation in implementation forms and details without departing from the spirit and scope disclosed in the present disclosure. However, the scope of patent protection of the present disclosure is still subject to the scope defined by the appended claims.

The invention claimed is:

1. A touch display driving apparatus, which is connected with a touch display panel; the touch display driving apparatus comprises a controller and a memory connected with the controller, wherein:

the memory is configured to store display data and touch data;

the controller is configured to perform a first reading and writing operation for reading and writing the display data in the memory, when the touch display panel is in a display working period; or, perform a second reading and writing operation for reading and writing the touch data in the memory, when the touch display panel is in a touch working period;

the controller comprises a first reading and writing module and a first arbitration module;

the first arbitration module is configured to determine different priorities for the first reading and writing operation for reading and writing the display data and the second reading and writing operation for reading and writing the touch data, when a conflict between the first reading and writing operation for reading and writing the display data and the second reading and writing operation for reading and writing the touch data occurs; and the first reading and writing module is configured to perform the first reading and writing operation for reading and writing the display data and the second reading and writing operation for reading and writing the touch data in the memory, in order of priority from high to low.

2. The apparatus of claim 1, further comprising a first timing controller and a second timing controller respectively connected with the controller, wherein the first timing controller is configured to output a first signal to the controller, when the touch display panel is in the display working period;

the second timing controller is configured to output a second signal to the controller, when the touch display panel is in the touch working period; and the controller is configured to perform the first reading and writing operation for reading and writing the display data in the memory, in response to the first signal; or, perform the second reading and writing operation for reading and writing the touch data in the memory, in response to the second signal, wherein a frequency of the second signal is the same as a frequency of the first signal.

3. The apparatus of claim 2, wherein clock cycles of the first signal and the second signal each comprise: a first time segment and a second time segment, wherein the second time segment follows the first time segment; and the controller is configured to perform, based on a signal corresponding to the first time segment in the first signal, the first reading and writing operation for reading and writing the display data in the memory; or, perform, based on a signal corresponding to the second time segment in the second signal, the second reading and writing operation for reading and writing the touch data in the memory.

4. The apparatus of claim 2, wherein the memory comprises: a random access memory.

5. The apparatus of claim 3, wherein the memory comprises: a random access memory.

6. The apparatus of claim 1, wherein a priority of the first reading and writing operation for reading and writing the display data is higher than a priority of the second reading and writing operation for reading and writing the touch data.

7. The apparatus of claim 6, wherein the memory comprises: a random access memory.

8. The apparatus of claim 1, wherein the first arbitration module is configured to determine that a priority of the first reading and writing operation for reading and writing the display data is higher than a priority of the second reading and writing operation for reading and writing the touch data, when a data amount of data to be read or written corresponding to the first reading and writing operation for reading and writing the display data is smaller than a data amount of data to be read or written corresponding to the second reading and writing operation for reading and writing the touch data; or, determine that the priority of the first reading and writing operation for reading and writing the display data is lower than the priority of the second reading and writing operation for reading and writing the touch data, when the data amount of data to be read or written corresponding to the first reading and writing operation for reading and writing the display data is larger than the data amount of data to be read or written corresponding to the second reading and writing operation for reading and writing the touch data.

9. The apparatus of claim 8, wherein the memory comprises: a random access memory.

10. The apparatus of claim 1, wherein the controller is further configured to read first data from data stored in the memory, in response to a first request message for reading the first data received from a host; and send the first data to the host; or, store second data received from the host into the memory, in response to a second request message for writing the second data from the host.

11. The apparatus of claim 10, wherein the controller comprises a second reading and writing module and a second arbitration module, wherein the second arbitration module is configured to, when a conflict between at least one reading and writing operation of the first reading and writing operation for reading and writing the display data and the second reading and writing operation for reading and writing the touch data and any one request message of the first request message for reading the first data and the second request message for writing the second data occurs, determine different priorities for the at least one reading and writing operation and the any one request message; and the second reading and writing module is configured to perform the at least one reading and writing operation in the memory and respond to the any one request message, in order of priority from high to low.

12. The apparatus of claim 10, wherein the memory comprises: a random access memory.

13. The apparatus of claim 11, wherein the memory comprises: a random access memory.

14. The apparatus of claim 1, wherein the memory comprises: a random access memory.

15. A touch display apparatus, comprising: a touch display panel and a touch display driving apparatus connected with the touch display panel, wherein the touch display driving apparatus is the touch display driving apparatus of claim 1.

16. The apparatus of claim 15, wherein the touch display apparatus is a wearable device.

17. The apparatus of claim 16, wherein the wearable device comprises: a host.

18. A driving method, applied to the touch display driving apparatus of claim 1, wherein the method comprises:

performing, by the controller in the touch display driving apparatus, the first reading and writing operation for reading and writing display data in the memory in the touch display driving apparatus, when the touch display panel is in the display working period; or, performing, by the controller, the second reading and writing operation for reading and writing touch data in the memory, when the touch display panel is in the touch working period.

* * * * *